United States Patent
Oda et al.

(10) Patent No.: US 10,488,040 B2
(45) Date of Patent: Nov. 26, 2019

(54) DUCT WALL SURFACE STRUCTURE

(71) Applicant: MITSUBISHI HITACHI POWER SYSTEMS, LTD., Kanagawa (JP)

(72) Inventors: Manabu Oda, Tokyo (JP); Kiyonori Kushioka, Tokyo (JP); Masashi Kiyosawa, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 747 days.

(21) Appl. No.: 14/916,045

(22) PCT Filed: Jul. 18, 2014

(86) PCT No.: PCT/JP2014/069134
§ 371 (c)(1),
(2) Date: Jun. 3, 2016

(87) PCT Pub. No.: WO2015/033679
PCT Pub. Date: Mar. 12, 2015

(65) Prior Publication Data
US 2016/0273766 A1    Sep. 22, 2016

(30) Foreign Application Priority Data

Sep. 4, 2013 (JP) .................. 2013-183297

(51) Int. Cl.
*B01D 45/00* (2006.01)
*F23J 3/04* (2006.01)
(Continued)

(52) U.S. Cl.
CPC .............. *F23J 3/04* (2013.01); *B01D 45/06* (2013.01); *B01D 45/08* (2013.01); *F01K 5/02* (2013.01);
(Continued)

(58) Field of Classification Search
CPC ........ F23J 3/04; F23J 2217/30; F23J 2217/20; B01D 45/08; B01D 45/06; F01K 5/02; F23M 5/00
See application file for complete search history.

(56) References Cited

U.S. PATENT DOCUMENTS 2,749,905 A * 6/1956 Johnson ................ F24B 1/1888
126/110 R
4,504,291 A    3/1985 Haddad et al.
(Continued)

FOREIGN PATENT DOCUMENTS

| CN | 2322048 | 6/1999 |
|---|---|---|
| CN | 1957204 | 5/2007 |

(Continued)

OTHER PUBLICATIONS

Decision to Grant a Patent dated Aug. 9, 2016 in corresponding Japanese Application No. 2013-183297 (with English translation).
(Continued)

*Primary Examiner* — Dung H Bui
(74) *Attorney, Agent, or Firm* — Wenderoth, Lind & Ponack, L.L.P.

(57) ABSTRACT

Provided is a duct wall surface structure which, in a flue of an iron-sheet duct with a hopper through which a solid-gas two-phase stream flows, can enhance the solid particle trapping efficiency of the hopper and reduce the outflow of the solid particles to the duct downstream side. The duct wall surface structure of a flue (10) through which a solid-gas two-phase stream containing large-diameter ash (50) flows includes a first hopper (20A) installed at the lower end of a first vertical flue section (12), installed in such a direction that the stream has a vertical component of velocity, to collect the large-diameter ash (50) from the stream, wherein a low-rebound part (60) having a lower coefficient of restitution than an iron sheet is provided on an inclined surface
(Continued)

(21), with which the large-diameter ash (50) collides, on the upstream side in the flow direction from the first hopper (20A).

6 Claims, 8 Drawing Sheets

(51) Int. Cl.
    *F23M 5/00*     (2006.01)
    *F01K 5/02*     (2006.01)
    *B01D 45/06*     (2006.01)
    *B01D 45/08*     (2006.01)

(52) U.S. Cl.
    CPC ............ *F23M 5/00* (2013.01); *F23J 2217/20* (2013.01); *F23J 2217/30* (2013.01)

(56) References Cited

U.S. PATENT DOCUMENTS

| | | | | |
|---|---|---|---|---|
| 5,687,657 | A * | 11/1997 | Ziegler | B01D 45/06 110/203 |
| 5,983,840 | A * | 11/1999 | Riccius | B01D 45/06 110/245 |
| 6,994,036 | B2 | 2/2006 | Grommes et al. | |
| 7,100,521 | B2 | 9/2006 | Ryan | |
| 8,292,992 | B2 * | 10/2012 | Sato | B01D 45/08 96/244 |
| 9,744,490 | B1 * | 8/2017 | Novosselov | B01D 45/16 |
| 2005/0150439 | A1 * | 7/2005 | Ryan | B01D 45/08 110/216 |
| 2008/0028935 | A1 * | 2/2008 | Andersson | B01D 45/04 95/272 |
| 2012/0204857 | A1 * | 8/2012 | Goodson | F24B 1/181 126/500 |
| 2013/0287639 | A1 * | 10/2013 | Ishikawa | B01D 53/8631 422/169 |
| 2014/0090560 | A1 | 4/2014 | Buzanowski et al. | |
| 2017/0038066 | A1 * | 2/2017 | Oda | F23J 15/022 |
| 2017/0328564 | A1 * | 11/2017 | Oda | F23J 3/04 |

FOREIGN PATENT DOCUMENTS

| | | | |
|---|---|---|---|
| CN | 101104125 | 1/2008 | |
| EP | 0 177 667 | 4/1986 | |
| EP | 1 855 056 | 11/2007 | |
| EP | 1855056 A2 * | 11/2007 | ............ B01D 45/06 |
| JP | 60-36817 | 2/1985 | |
| JP | 1-169933 | 11/1989 | |
| JP | 2-95415 | 4/1990 | |
| JP | 2724176 | 3/1998 | |
| JP | 10-165734 | 6/1998 | |
| JP | 2008-241061 | 10/2008 | |
| JP | 2012-115719 | 6/2012 | |
| JP | 2013-155940 | 8/2013 | |
| TW | 200537057 | 11/2005 | |
| WO | 2012/073873 | 6/2012 | |

OTHER PUBLICATIONS

Extended European Search Report dated Sep. 19, 2016 in corresponding European Application No. 14841726.4.
International Search Report dated Oct. 21, 2014 in corresponding International Application No. PCT/JP2014/069134.
Written Opinion of the International Searching Authority dated Oct. 21, 2014 in corresponding International Application No. PCT/JP2014/069134.
Office Action dated Sep. 23, 2015 in corresponding Taiwanese Application No. 103124386 (with English translation).
Decision to Grant a Patent dated Mar. 22, 2016 in corresponding Taiwanese Application No. 103124386.
Office Action dated Dec. 19, 2016 in corresponding Chinese Application No. 201480048218.2 (with English translation).

* cited by examiner

FIG. 4
(a)
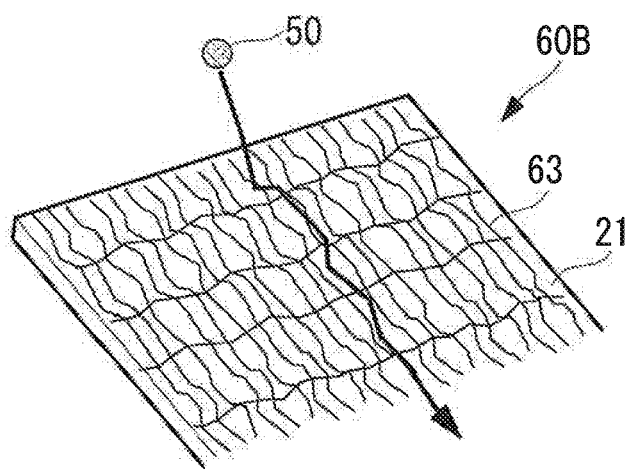
(b)
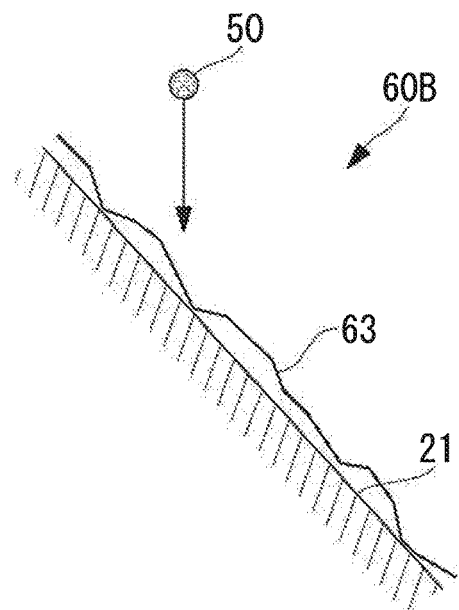

DUCT WALL SURFACE STRUCTURE

TECHNICAL FIELD

The present invention relates to a duct wall surface structure of an iron-sheet duct through which a solid-gas two-phase stream containing solid particles flows, such as combustion exhaust gas discharged from a coal-fired boiler.

BACKGROUND ART

Conventionally, a coal-fired boiler discharges combustion exhaust gas, produced by coal combustion, from a furnace. This combustion exhaust gas contains fly ash and coal ash (solid particles) called high-porosity large-diameter ash (hereinafter referred to as "large-diameter ash"), with the details varying depending on the type of coal.

Of these ashes, fly ash is extremely fine particles with a particle size in the order of several micrometers. By comparison, large-diameter ash is relatively large particles with a particle size of about 1 mm or more, but has a low apparent specific gravity due to its high porosity.

A solid-gas two-phase stream discharged from a furnace 2 of a coal-fired boiler 1 passes through a flue 10, which is formed, for example, by an iron-sheet duct as shown in FIG. 9, and is subjected to necessary treatment, such as denitrification, before being released into the atmosphere through a funnel etc. (not shown).

In the flue 10 shown in FIG. 9, a first horizontal flue section 11, a first vertical flue section 12, a second horizontal flue section 13, a second vertical flue section 14, a third horizontal flue section 15, and a third vertical flue section 16 are provided sequentially from the upstream side in the flow direction of combustion exhaust gas, i.e., from the side of the furnace 2. Reference sign G in the drawings represents the flow of combustion exhaust gas, and 50 represents large-diameter ash.

In the configuration example shown in FIG. 9, a first hopper 20 and a second hopper 30 are installed at the lower ends of the first vertical flue section 12 and the second vertical flue section 14, respectively, to collect large-diameter ash scattered from the furnace 2. In addition, a denitrification apparatus 40, which denitrifies combustion exhaust gas passing therethrough, is installed in the third vertical flue section 16. The first hopper 20 installed at the lower end of the first vertical flue section 12 includes an inclined surface 21 of which the angle is set such that collected large-diameter ash falls. However, being an iron-sheet wall surface as with the duct, the conventional inclined surface 21 has a high coefficient of restitution, so that large-diameter ash rebounding far off the inclined surface 21 has a high probability of jumping over the first hopper 20 and scattering to the second horizontal flue section 13.

In particular, since the flow velocity of combustion exhaust gas is higher at the center of the cross-section of the flue 10, large-diameter ash having jumped over the first hopper 20 and joined the fast stream of combustion exhaust gas is highly likely to reach the denitrification apparatus 40 without being collected in the second hopper 30, either, due to its low apparent specific gravity.

For example, the denitrification apparatus 40 has a configuration in which a denitrification agent (denitrification catalyst) of vanadium dioxide supported on a lattice-shaped titanium oxide carrier is placed in a pallet, and a large number of this pallet are disposed inside the apparatus. Thus, combustion exhaust gas, which is a solid-gas two-phase stream, is denitrified while passing through the denitrification apparatus 40, but at the same time the lattice-shaped denitrification catalyst is clogged with large-diameter ash passing therethrough along with the combustion exhaust gas.

To prevent such clogging of a denitrification catalyst, a common practice is to install a metal-mesh trapping screen S inside the flue on the downstream side from the first hopper 20, as shown in PTL 1 and PTL 2, for example.

CITATION LIST

Patent Literature

{PTL 1}
U.S. Pat. No. 6,994,036
{PTL 2}
Japanese Unexamined Patent Application, Publication No. Hei 2-95415
{PTL 3}
Japanese Unexamined Patent Application, Publication No. 2008-241061

SUMMARY OF INVENTION

Technical Problem

As the trapping screen S installed inside the flue on the downstream side from the first hopper 20 wears or clogs itself, replacement etc. of the screen is required, which pushes up the operation cost. Moreover, if the trapping screen S is clogged, the effective flow channel cross-sectional area of the flue 10 is reduced, which may lead to larger pressure loss.

In view of these circumstances, it is desirable, in the duct wall surface structure of a flue through which a solid-gas two-phase stream flows such as combustion exhaust gas discharged from a coal-fired boiler, to enhance the efficiency of trapping solid particles like large-diameter ash in the hopper and thereby reduce the outflow of the solid particles to the downstream side of the flue.

Having been devised to solve the above problems, the present invention aims to provide a duct wall surface structure which, in a flue of an iron-sheet duct equipped with a hopper through which a solid-gas two-phase stream flows, can enhance the solid particle trapping efficiency of the hopper and thereby reduce the outflow of the solid particles to the downstream side of the duct.

Solution to Problem

To solve the above problems, the present invention has adopted the following solutions.

According to one aspect of the present invention, there is provided a duct wall surface structure of an iron-sheet duct through which a solid-gas two-phase stream containing solid particles flows, the duct wall surface structure including a hopper provided at the lower end of the iron-sheet duct which is installed in such a direction that the stream has a vertical component of velocity or in a middle of the duct to collect the solid particles from the stream, wherein a low-rebound structure part having a lower coefficient of restitution than an iron sheet is provided in a region of an inner wall surface of the duct with which the solid particles collide, or provided inside a flow channel of the duct, on the upstream side or the downstream side in the flow direction from the hopper.

According to such a duct wall surface structure, the amount of rebound of solid particles colliding with the low-rebound structure part is reduced, since the low-rebound structure part having a lower coefficient of restitution than an iron sheet is provided in the region of the inner wall surface of the duct with which the solid particles collide, or provided inside the flow channel of the duct, on the upstream side or the downstream side in the flow direction from the hopper.

As a result, if the low-rebound structure part is located on the upstream side in the flow direction from the hopper, the amount of solid particles jumping over the hopper and scattering and flowing out to the downstream side is reduced, so that the solid particle trapping efficiency of the hopper is enhanced. On the other hand, if the low-rebound structure part is located on the downstream side in the flow direction from the hopper, the amount of solid particles reaching the center of the flow channel cross-section or the vicinity thereof, where the flow velocity is higher, and flowing out to the downstream side along with the stream is reduced, so that the solid particle trapping efficiency of the hopper is enhanced as the solid particles having separated from the stream and fallen into the hopper are collected.

In the above aspect, it is preferable that the low-rebound structure part is a low-rebound structure part forming member which is installed on the inner wall surface of the iron-sheet duct with a space therebetween and includes openings serving as a passage for the solid particles. In this case, the solid particles having passed through the openings of the low-rebound structure part forming member have a high probability of rebounding upon collision with the inner wall surface and then re-colliding with the rear side of the low-rebound structure part forming member. Thus, the solid particles fall inside the space along the inner wall surface and are collected in the hopper. Moreover, as the amount of rebound of the solid particles colliding with the low-rebound structure part forming member having a lower coefficient of restitution than an iron sheet is reduced, the trapping efficiency of the hopper is enhanced.

A preferred low-rebound structure part forming member is desirably a lattice-shaped member, such as a metal mesh, a grating, or a perforated plate, which has a large number of openings of a size large enough for solid particles to pass through. In particular, if an elastically-deformable material, such as a metal mesh, is adopted, the collision energy of solid particles can be efficiently absorbed through elastic deformation.

In the above aspect, it is preferable that the low-rebound structure part is a low-rebound part forming member which is installed on the inner wall surface of the iron-sheet duct and elastically deforms upon collision of the solid particles therewith. Thus, since the collision energy of the solid particles is efficiently absorbed through elastic deformation, the amount of rebound of the solid particles colliding with the low-rebound structure part forming member is reduced, and the trapping efficiency of the hopper is enhanced accordingly.

A material, such as a wire, a metal mesh, or a heat insulation material, which elastically deforms upon collision of solid particles therewith can be used as the low-rebound structure part forming member.

In the above aspect, the solid-gas two-phase stream is combustion exhaust gas which is discharged from a coal-fired boiler and contains coal ash. In this case, as the amount of rebound of large-diameter ash of the coal ash colliding with the low-rebound structure part is reduced, the trapping efficiency of the hopper is enhanced, as well as the amount of solid particles reaching a denitrification apparatus installed on the downstream side is reduced.

Advantageous Effects of Invention

According to the above-described present invention, in an iron-sheet duct (flue) equipped with a hopper through which a solid-gas two-phase stream flows, the solid particle trapping efficiency of the hopper can be enhanced and thereby the outflow of the solid particles to the downstream side of the duct can be reduced.

BRIEF DESCRIPTION OF DRAWINGS

FIG. 3 is a view showing a first specific example of a low-rebound structure part shown in FIG. 2, in which FIG. 3(a) is a perspective view showing the outline of a low-rebound structure part formed by installing a member having a large number of openings on a wall surface with a space provided therebetween; FIG. 3(b) is a cross-sectional view showing the movement of a solid particle having passed through the opening; and FIG. 3(c) is a cross-sectional view showing the movement of a solid particle which has failed to pass through the opening.

FIG. 4 is a view showing a second specific example of the low-rebound structure part shown in FIG. 2, in which FIG. 4(a) is a perspective view showing the outline of a low-rebound structure part formed by installing a low-rebound member, such as wires, on the wall surface, and FIG. 4(b) is a cross-sectional view of FIG. 4(a).

FIG. 8 is a view showing other examples of the flue to which the duct wall surface structure of the present invention is applicable, in which FIG. 8(a) is an example of the flue composed of a horizontal flue section and a vertical flue section through which a stream flows upward; FIG. 8(b) is an example of the flue composed of an inclined flue; and FIG. 8(c) is an example of the flue composed of a horizontal flue section and a vertical flue section through which a stream flows downward.

DESCRIPTION OF EMBODIMENTS

In the following, one embodiment of a duct wall surface structure according to the present invention will be described on the basis of the drawings.

Figure 1:
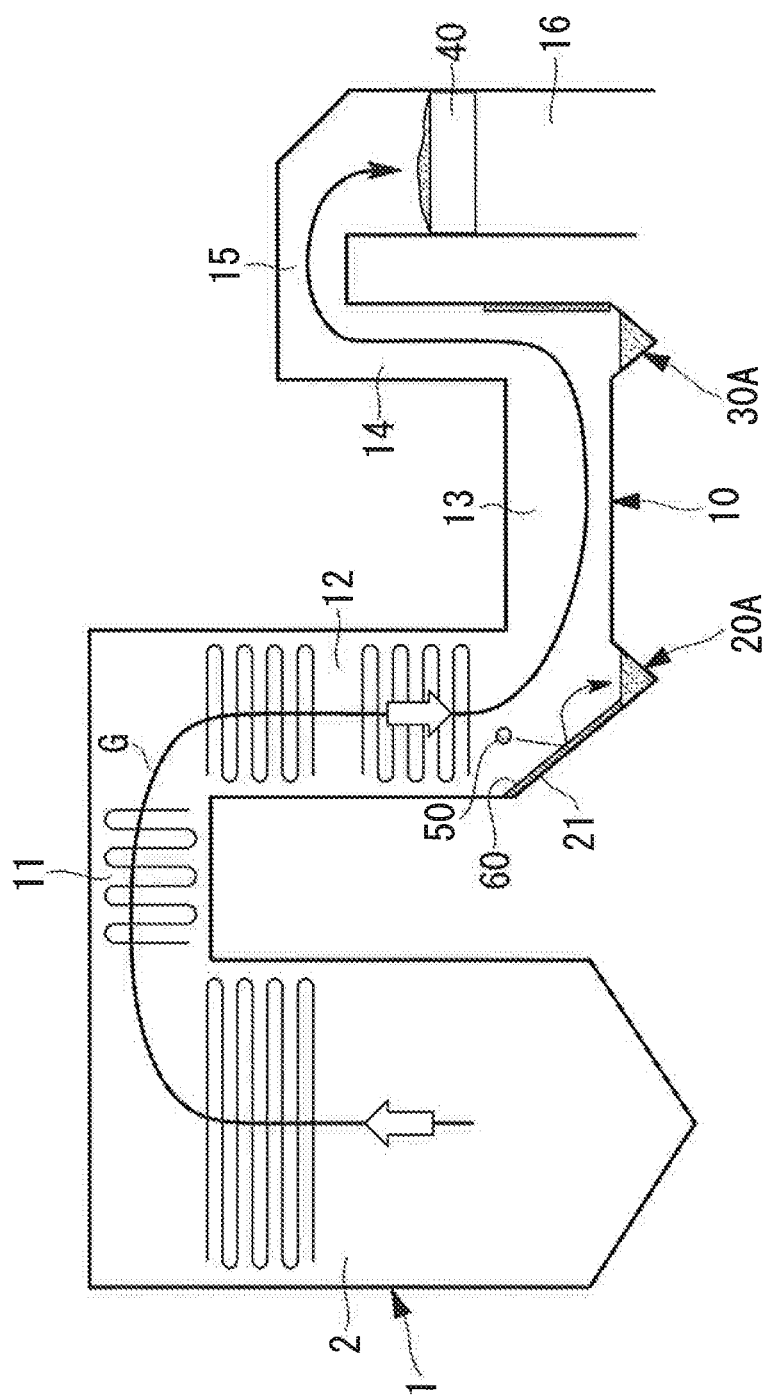
FIG. 1 is a longitudinal cross-sectional view showing a flue of a coal-fired boiler as one embodiment of a duct wall surface structure according to the present invention.

FIG. 1 illustrates a duct wall surface structure of a flue 10 through which combustion exhaust gas, which is a solid-gas two-phase stream discharged from a furnace 2 of a coal-fired boiler 1, flows before being released into the atmosphere through a funnel etc. (not shown). This flue 10 is a combustion exhaust gas flow channel formed by an iron-sheet duct, and typically has a rectangular cross-section. The combustion exhaust gas discharged from the furnace 2 is a solid-gas two-phase stream containing fly ash and coal ash (solid particles) called large-diameter ash. The combustion exhaust gas is subjected to necessary treatment, such as denitrification, while passing through the flue 10, and then flows as indicated by the arrow G in FIG. 1 before being released into the atmosphere through a funnel etc. (not shown).

In the flue 10 shown in FIG. 1, a first horizontal flue section 11, a first vertical flue section 12, a second horizontal flue section 13, a second vertical flue section 14, a third horizontal flue section 15, and a third vertical flue section 16 are provided sequentially from the side of the furnace 2 which is the upstream side in the flow direction of combustion exhaust gas.

In the flue 10 shown in FIG. 1, a first hopper 20A is installed at the lower end of the first vertical flue section 12 through which combustion exhaust gas having a downward component of velocity flows, and a second hopper 30A is installed at the lower end of the second vertical flue section 14 through which combustion exhaust gas having an upward component of velocity flows. In the third vertical flue section 16 through which combustion exhaust gas flows downward, a denitrification apparatus 40 which denitrifies combustion exhaust gas passing therethrough is installed.

The above-mentioned first hopper 20A and second hopper 30A are installed mainly for the purpose of collecting large-diameter ash contained in combustion exhaust gas. Fly ash of an extremely small particle size is rarely separated from the stream of combustion exhaust gas, and therefore, unlike large-diameter ash, flows through the flue 10 without being collected in the first hopper 20A and the second hopper 30A.

Figure 2:
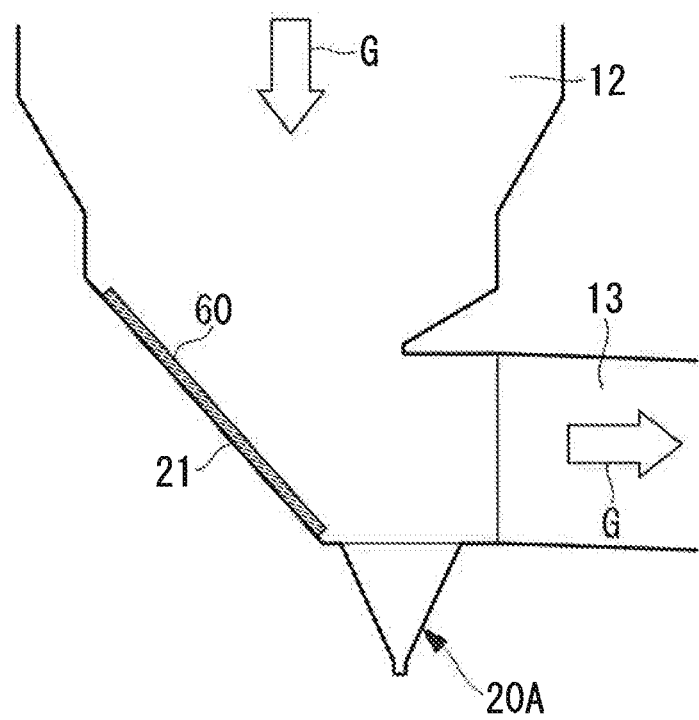
FIG. 2 is an enlarged longitudinal cross-sectional view showing the structure around a first hopper in the duct wall surface structure shown in FIG. 1.

As shown in FIG. 1 and FIG. 2, the first hopper 20A includes an inclined surface 21 on the upstream side of which the angle is set to be an angle of repose or larger so that large-diameter ash falls. In this embodiment, to effectively enhance the trapping efficiency of the first hopper 20A, the inclined surface 21 on the upstream side from the first hopper 20A is designed as a low-rebound part (low-rebound structure part) 60 having a low-rebound structure with a lower coefficient of restitution than that of an iron sheet.

That is, the inclined surface 21 is at the same time the duct inner wall surface of the flue 10 located in the vicinity of the first hopper 20A on the upstream side (located near the hopper), and if this inclined surface 21 is designed as the low-rebound part 60 having a low-rebound structure, the amount of rebound upon collision with the low-rebound part 60 of the large-diameter ash 50 falling along with a downward stream is suppressed.

As a result, the large-diameter ash 50 falling along with a downward stream (the flow of combustion exhaust gas having a downward component of velocity) rebounds in a smaller amount than when the large-diameter ash 50 collides directly with the conventional inclined surface 21 which is an iron plate. Thus, the large-diameter ash 50 has a lower probability of jumping over the first hopper 20A and scattering to the second horizontal flue section 13, and the large-diameter ash trapping efficiency of the first hopper 20A is enhanced accordingly. Such enhancement in large-diameter ash trapping efficiency leads to a reduction in amount of large-diameter ash 50 scattering and flowing out to the downstream side of the flue 10. Accordingly, the amount of large particle ash (LPA) reaching the denitrification apparatus 40 installed in the third vertical flue section 16 can be reduced.

Here, specific configuration examples of the above-described low-rebound part 60 will be described on the basis of the drawings.

Figure 3:
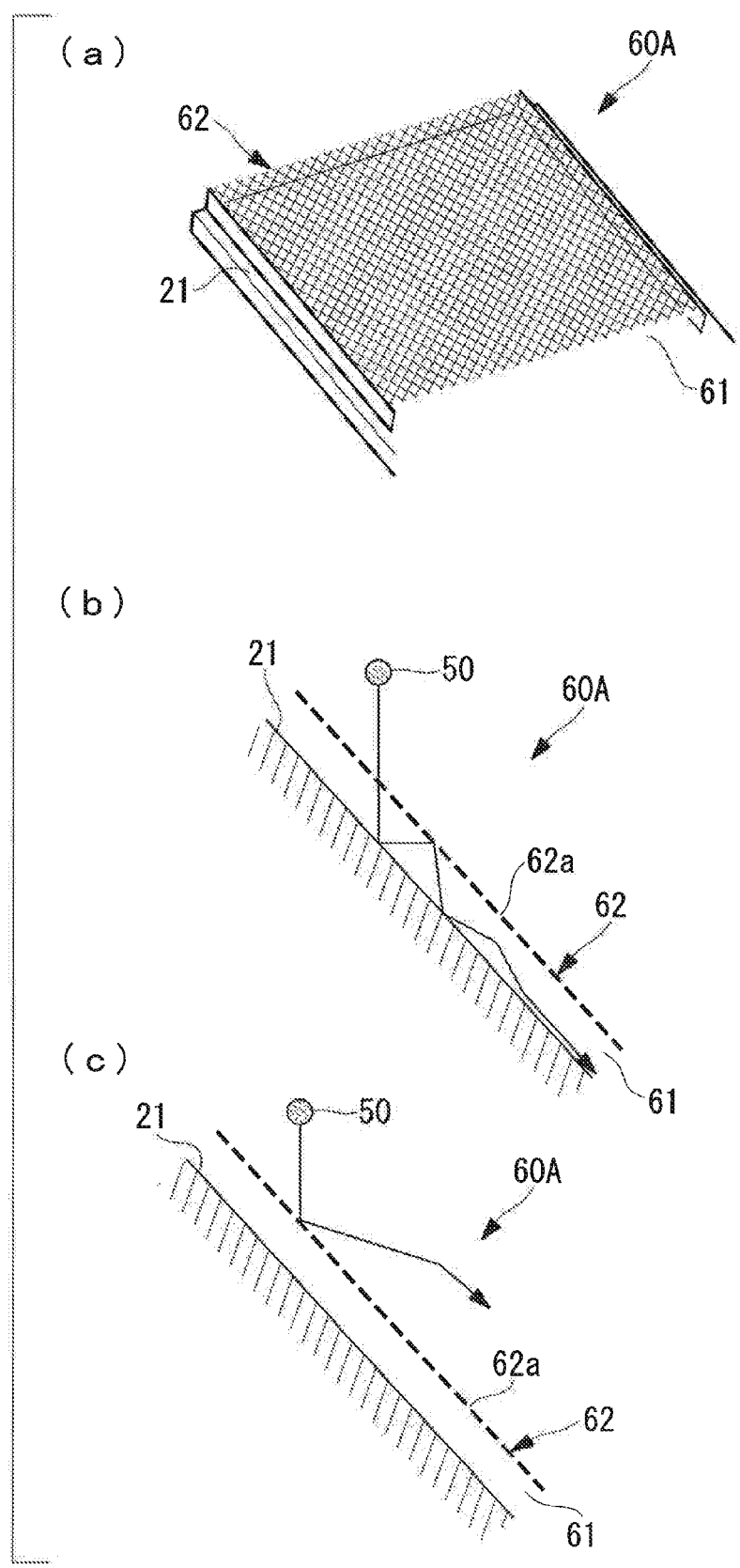

A low-rebound part 60A of a first specific example shown in FIG. 3 is formed by installing a metal mesh (low-rebound structure part forming member) 62 on the inclined surface 21, which is the inner wall surface of the iron-sheet duct, with a space 61 provided therebetween. This metal mesh 62 is provided with a large number of openings 62a serving as a passage for the large-diameter ash 50.

If such a low-rebound part 60A is adopted, as shown in FIG. 3(b), the solid particle having passed through the opening 62a of the metal mesh 62 rebounds upon collision with the inclined surface 21 which is the inner wall surface of the iron-sheet duct, but has a high probability of thereafter re-colliding with the rear side of the metal mesh 62. Thus, the large-diameter ash 50 having collided with the rear side of the metal mesh 62 falls inside the space 61 along the inclined surface 21 and is eventually collected in the first hopper 20A.

However, not all of the large-diameter ash 50 passes through the openings 62a of the metal mesh 62, but some collide with the metal mesh 62 which is composed of linear members combined into a lattice shape. As shown in FIG. 3(c), the large-diameter ash 50 having collided with the linear member of the metal mesh 62 collides with the member which has a lower coefficient of restitution than a common iron sheet and is easily elastically-deformable. As a result, the amount of rebound is reduced and this large-diameter ash 50 has a higher probability of being collected in the first hopper 20A.

Thus, the above-described low-rebound part 60A allows the first hopper 20A to efficiently collect the large-diameter ash 50 having passed through the openings of the metal mesh 62 and the large-diameter ash 50 having collided with the metal mesh 62, and is therefore effective in enhancing the efficiency of trapping the large-diameter ash 50 in the first hopper 20A.

While the metal mesh 62 is used as the low-rebound member in the above first specific example, other than the metal mesh 62, members, such as a grating, a perforated plate, and a blind structure (shutter), which have a lattice shape having a large number of openings of a size large enough for the large-diameter ash 50 to pass through can be used as the low-rebound member suitable for this specific example.

In particular, if a lattice-shaped low-rebound member composed of a material which, like the linear members of the metal mesh 62, elastically deforms upon collision of the large-diameter ash 50 therewith is adopted, it is possible to efficiently absorb the collision energy of the large-diameter ash 50 through elastic deformation and thereby reduce the amount of rebound. The amount of rebound can also be reduced as the colliding large-diameter ash 50 rolls.

A low-rebound part 60B of a second specific example shown in FIG. 4 is formed by installing a large number of wires (low-rebound part forming members) 63 with appropriate portions fixed on the wall surface of the inclined surface 21. The wire 63 is a material which has lower rigidity than an iron sheet and elastically deforms upon collision of the large-diameter ash 50 therewith. Therefore, the wires 63 are easy to attach/remove or fix when used as a bundle of several wires 63, and it is desirable that the wires 63 are arranged in a lattice shape appropriately combining longitudinal wires and lateral wires as necessary.

Such wires 63 efficiently absorb the collision energy through elastic deformation upon collision of the large-diameter ash 50 therewith, so that the amount of rebound of the colliding large-diameter ash 50 is reduced and the trapping efficiency of the first hopper 20A is enhanced accordingly. Moreover, the large-diameter ash 50 is likely to roll upon collision with the wires 63, which also contributes to the reduction of velocity energy and the suppression of rebound of the large-diameter ash 50.

While the wires 63 are used as the low-rebound member in the above second specific example, other than the wires 63, members like a metal mesh which are composed of a material elastically deforming upon collision of the large-diameter ash 50 therewith can be used as the low-rebound member suitable for this specific example.

Figure 5:
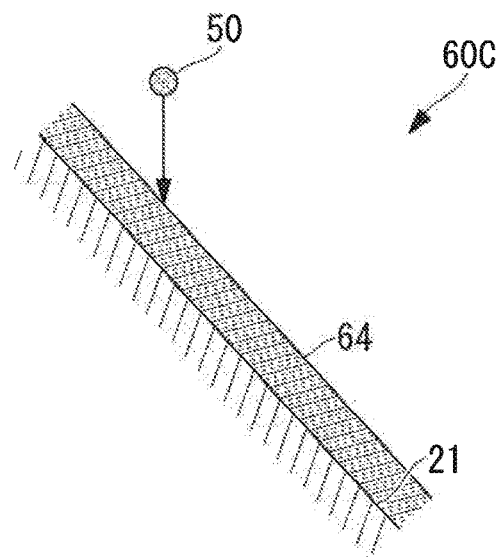
FIG. 5 is a view showing a third specific example of the low-rebound structure part shown in FIG. 2, and is a cross-sectional view of a low-rebound structure part formed by installing a low-rebound member in a substantially planar shape on the wall surface.

Like a low-rebound part 60C shown in FIG. 5 as a third specific example, a flat-sheet material, such as a heat insulation material 64, can also be adopted as the low-rebound member and attached to the inclined surface 21. When the heat insulation material 64 is adopted, a liner of an iron sheet etc. having a high coefficient of restitution is not provided on the surface of the heat insulation material 64 on the inner wall surface side of the flue 10, i.e., on the surface of the heat insulation material with which the large-diameter ash 50 collides.

Since such a heat insulation material 64 elastically deforms upon collision of the large-diameter ash 50 therewith and efficiently absorbs the collision energy, the amount of rebound of the colliding large-diameter ash 50 is reduced and the trapping efficiency of the first hopper 20A is enhanced accordingly.

Other than the heat insulation material 64, for example, a rubber material or a plastic material having a lower coefficient of restitution than an iron sheet can be used as the flat-sheet low-rebound part 60C.

Figure 6:
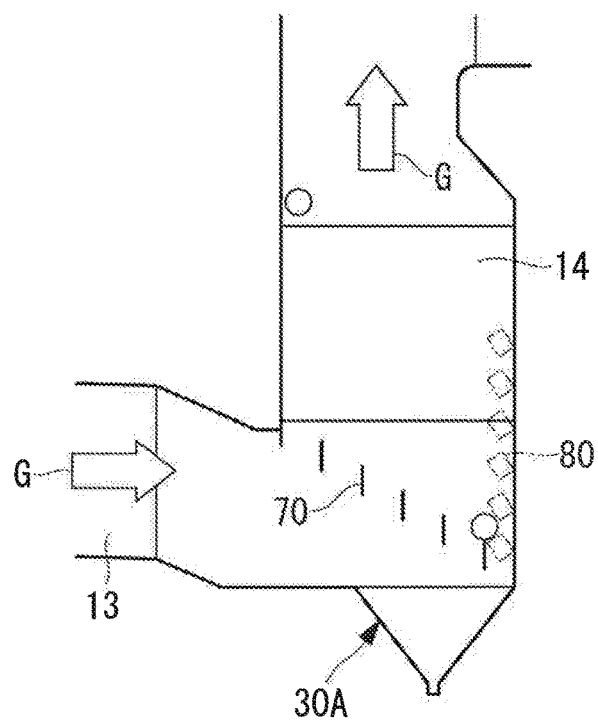
FIG. 6 is an enlarged longitudinal cross-sectional view showing the structure around a second hopper in the duct wall surface structure shown in FIG. 1.

Next, low-rebound parts (low-rebound structure parts) 70, 80 having a low-rebound structure shown in FIG. 6 are provided in a region of the inner wall surface with which the large-diameter ash 50 collides, or provided inside the flow channel, on the downstream side from the second hopper 30A. That is, the second hopper 30A is installed at the lower end of the second vertical flue section 14 through which an upward stream flows (the flow of combustion exhaust gas having an upward component of velocity), and the low-rebound structure parts 70, 80 having a lower coefficient of restitution than an iron sheet are provided on the downstream side from the second hopper 30A.

The low-rebound structure part 70 shown in FIG. 6 is provided inside the flow channel of the flue 10 on the downstream side from the second hopper 30A, specifically, inside the flue flow channel at the joint between the second horizontal flue section 13 and the second vertical flue section 14 where the flow direction of the stream is changed from the horizontal direction to the upward direction. In other words, the low-rebound structure part 70 is provided inside the flue flow channel, above the second hopper 30A. For example, this low-rebound structure part 70 has a blind structure composed of a plurality of faces facing a horizontal stream. As the large-diameter ash 50 colliding with the faces of the blind structure slows down and falls into the second hopper 30A, the trapping efficiency of the second hopper 30A is enhanced.

The low-rebound part 80 shown in FIG. 6 is provided in a region of the inner wall surface with which the large-diameter ash 50 collides on the downstream side from the second hopper 30A, specifically, provided on the wall surface of the second vertical flue section 14 with which a horizontal stream flowing through the second horizontal flue section 13 collides. For example, a metal mesh, a bundle of wires, a grating, etc. can be used as this low-rebound part 80.

If such a low-rebound part 80 is provided, most of the large-diameter ash 50, which has joined a stream flowing in the horizontal direction through the second horizontal flue section 13, collides under inertial force with the low-rebound part 80 provided in the region of the inner wall surface at the far end of the second horizontal flue section 13. The large-diameter ash 50 rebounding upon this collision heads for the center in the flow channel cross-section of the second vertical flue section 14, but, due to the lower coefficient of restitution than that of a conventional iron sheet, the large-diameter ash 50 reaches the center of the flow channel cross-section and the vicinity thereof, where the flow velocity is higher, at a lower rate.

That is, if the low-rebound part 80 is provided on the downstream side in the flow direction from the second hopper 30A, as the amount of rebound of the large-diameter ash 50 colliding with the low-rebound part 80 is reduced, the amount of large-diameter ash 50 reaching the center of the flow channel cross-section and the vicinity thereof, where the flow velocity is higher, and flowing out to the downstream side along with the stream is reduced. As a result, the amount of large-diameter ash 50 separating from the stream and falling increases, and therefore collecting this large-diameter ash 50 in the second hopper 30A can enhance the trapping efficiency of the large-diameter ash 50 in the second hopper 30A.

In this case, the configurations of the first to third specific examples described above can be adopted for the low-rebound part 80. Alternatively, a configuration in which the low-rebound part 80 is appropriately combined with the low-rebound part 70 can also be adopted depending on the conditions.

Here, examples of materials having a lower coefficient of restitution than an iron sheet include, other than rubber materials and plastic materials, stainless steel, copper, aluminum, phosphor bronze, monel, highly corrosion-resistant alloys (HC-22, HC-276), nickel-based superalloys (Inconel 600(R), Inconel 601(R)), nickel, and nickel 201. These materials can be appropriately selected and used in the form of a sheet, a metal mesh, wires, etc. as described above.

Figure 7:
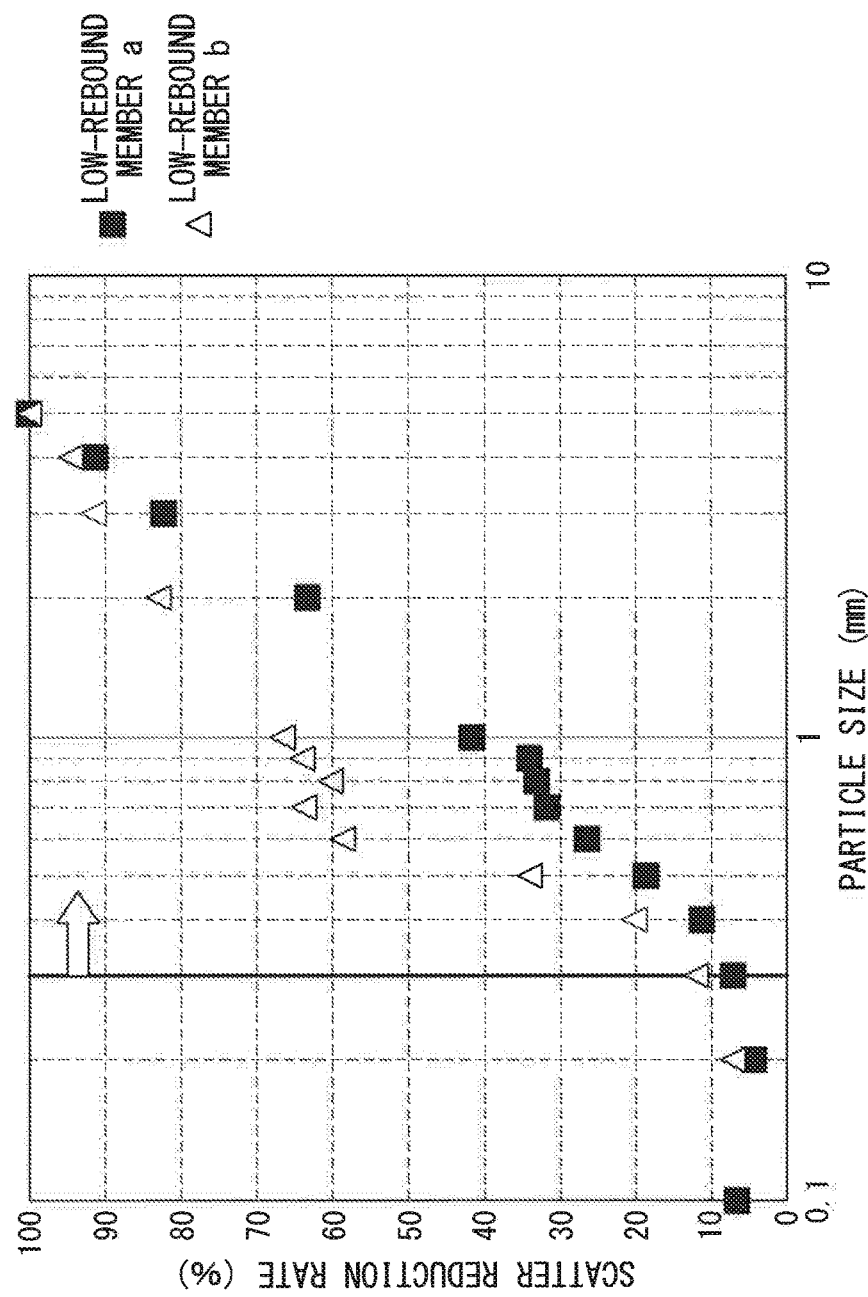
FIG. 7 is a view showing the relation between the particle size of solid particles and a scatter reduction rate for two types of low-rebound members.

FIG. 7 shows results of a trial calculation in which the relation between the particle size (mm), which is the diameter of solid particles, and the scatter reduction rate (%) for the above-described low-rebound structure was numerically simulated. Specifically, FIG. 7 shows a trial calculation for verifying the effectiveness of the low-rebound structure, in which the above-described low-rebound structure is more effective for a particle size for which the scatter reduction rate is higher. The trial calculation of the relation shown in FIG. 7 involves two types of low-rebound structures (low-rebound member a, low-rebound member b). The scatter reduction rate starts to increase when the particle size (d) is about 0.3 mm, and the scatter reduction rate reaches 100% when the particle size (d) is as large as about 5 mm. Thus, the low-rebound structure of the above embodiment is effective when the particle size (d) of the solid particles is within the range of 0.3 mm or more to 5 mm or less.

Figure 8:
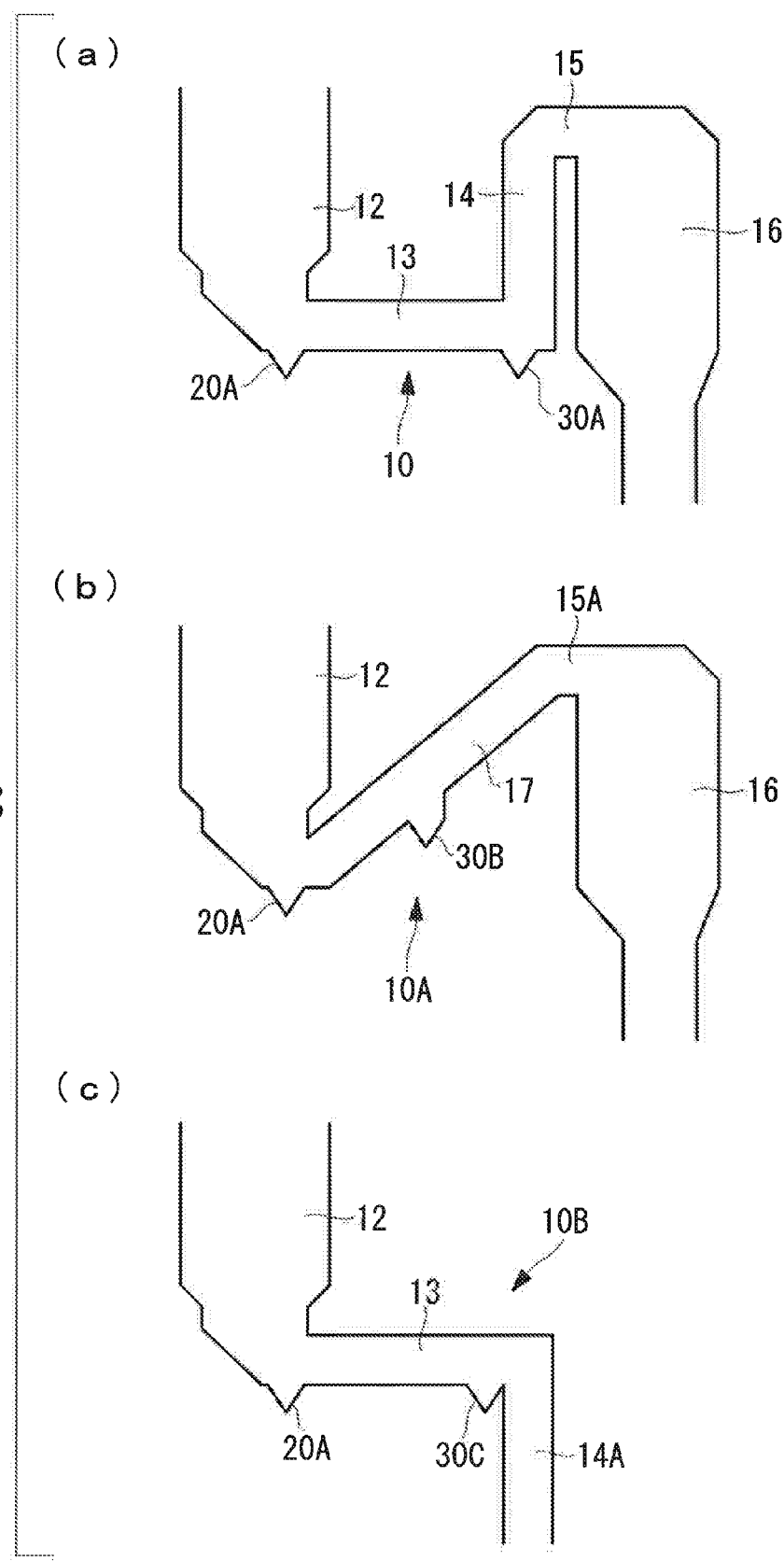
Figure 9:
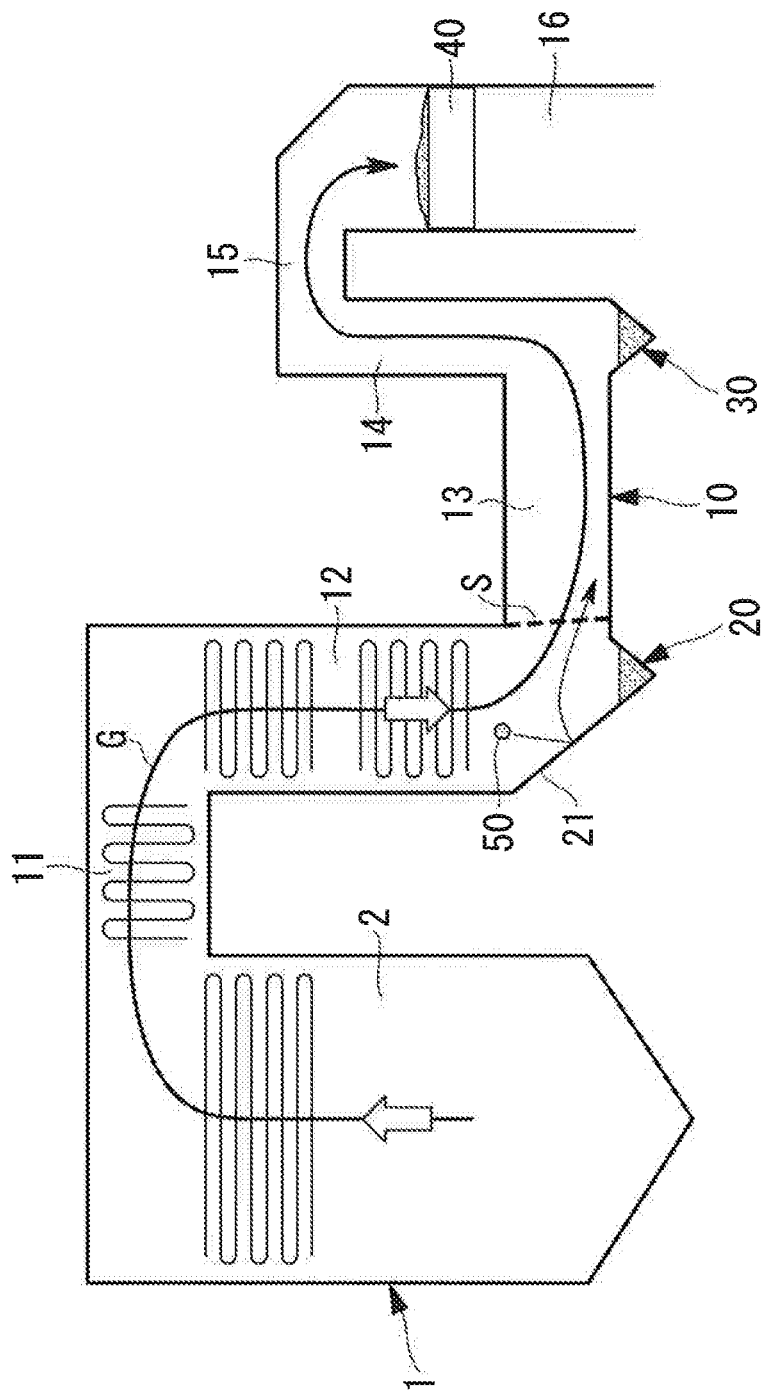
FIG. 9 is a longitudinal cross-sectional view showing a flue of a coal-fired boiler as an example of a conventional duct wall surface structure.

The flues (iron-sheet duct structures) shown in FIG. 8 are other configuration examples to which the duct wall surface structure of the above embodiment is applicable.

As with the embodiment shown in FIG. 1, the flue 10 shown in FIG. 8(a) is an example of the flue composed of a horizontal flue section and a vertical flue section through which a stream flows upward. In this example of the flue, the first hopper 20A and the second hopper 30A are installed at the lower ends of the first vertical flue section 12 and the second vertical flue section 14, respectively, which are connected at both ends of the second horizontal flue section 13.

A flue 10A shown in FIG. 8(b) is an example of the flue composed of the first vertical flue section 12 and a horizontal flue section 15A, with an inclined flue 17, in which a stream has an upward component of velocity, connecting therebetween. In this example of the flue, the first hopper 20A is installed at the lower end of the first vertical flue section 12, and a second hopper 30B is installed in the middle of the inclined flue 17.

In this example of the flue, providing a low-rebound structure in the form of a blind, for example, inside the flow channel on the downstream side from the second hopper 30B can enhance the trapping efficiency.

A flue 10B shown in FIG. 8(c) is an example of the flue composed of a horizontal flue section and a vertical flue section through which a stream flows downward. Specifically, the flue 10B includes, instead of the second vertical flue section 14 shown in FIG. 8(a), a second vertical flue section 14A which is provided downward from the end of the second horizontal flue section 13. In this example of the flue, since a stream flows downward in the vertical direction on the downstream side from a second hopper 30C, providing a low-rebound structure in the form of a blind, for example, inside the flow channel on the upstream side or the downstream side from the second hopper 30C can enhance the trapping efficiency.

Thus, according to the above embodiment, in an iron-sheet duct (flue) through which combustion exhaust gas flows (solid-gas two-phase stream) discharged from the coal-fired boiler 1 and containing coal ash, the large-diameter particle trapping efficiency of the hopper provided in the middle of the duct can be enhanced, and therefore the outflow of the solid particles to the downstream side of the duct can be reduced. As a result, it is possible, for example, to reduce the large-diameter ash reaching the denitrification apparatus 40, and to thereby suppress or prevent the clogging of the denitrification catalyst.

In the above embodiment, the solid-gas two-phase stream containing solid particles is assumed to be coal-ash discharged from the furnace 2 of the coal-fired boiler 1. However, the iron-sheet duct employing the duct wall surface structure of the embodiment is also applicable to apparatuses through which flow various streams containing, for example, soot, iron powder, diesel exhaust particles, and unburned particles, as solid particles.

The present invention is not limited to the above-described embodiment but can be appropriately modified within the scope of the present invention.

REFERENCE SIGNS LIST

1 Coal-fired boiler
2 Furnace
10, 10A, 10B Flue
20, 20A First hopper
21 Inclined surface
30, 30A to 30C Second hopper
40 Denitrification apparatus
50 High-porosity large-diameter ash (large-diameter ash)
60, 60A to 60C, 70, 80 Low-rebound part (low-rebound structure part)

The invention claimed is:

1. A duct wall surface structure of a duct,
wherein the duct is formed from an iron-sheet material and is configured to flow a solid-gas two-phase stream containing solid particles therethrough,
wherein the duct wall surface structure comprises a hopper which is provided at a lower end of the duct which is installed in such a direction that the stream has a vertical component of velocity and which is configured to collect the solid particles from the stream,
wherein a low-rebound structure part, having a lower coefficient of restitution than the iron-sheet material of the duct, is provided in a region of an inner wall surface of the duct with which the solid particles collide, on an upstream side or a downstream side in a flow direction from the hopper,
wherein the low-rebound structure part is a low-rebound structure part forming member which is installed opposing to and along the inner wall surface of the duct, the inner wall surface being inclined, and elastically deforms upon collision of the solid particles therewith, and
wherein the low-rebound structure part is a large number of wires which is fixed on the inclined inner wall surface of the duct.

2. The duct wall surface structure according to claim 1, wherein the solid-gas two-phase stream is combustion exhaust gas which is discharged from a coal-fired boiler and contains coal ash.

3. The duct wall surface structure according to claim 1, wherein the low-rebound structure part is a flat-sheet material which is installed on the inclined inner wall surface of the duct.

4. The duct wall surface structure according to claim 1, further comprising
a second hopper provided at a lower end of a flue section of the duct, which is connected on a downstream side in the a direction of a horizontal flue section of the duct and installed in such a direction that the stream has a vertical component of velocity to collect the solid particles from the stream,
wherein a second low-rebound structure part which has a lower coefficient of restitution than an iron sheet is provided inside a flow channel of the duct in a region of the inner wall surface with which the solid particles collide on a downstream side in the flow direction from the second hopper.

5. The duct wall surface structure according to claim 4, wherein the solid-gas two-phase stream is combustion exhaust gas which is discharged from a coal-fired boiler and contains coal ash.

6. The duct wall surface structure according to claim 4, wherein a third low-rebound structure part which has a blind structure composed of a plurality of faces facing a horizontal stream and has a lower coefficient of restitution than an iron sheet is provided inside a flow channel of the duct on a downstream side in the flow direction from the second hopper or above the second hopper.

* * * * *